United States Patent
Byun et al.

(10) Patent No.: US 8,785,037 B2
(45) Date of Patent: Jul. 22, 2014

(54) SECONDARY BATTERY WITH STEPPED CAP PLATE

(75) Inventors: Sangwon Byun, Yongin-si (KR); Chiyoung Lee, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 95 days.

(21) Appl. No.: 13/187,401

(22) Filed: Jul. 20, 2011

(65) Prior Publication Data

US 2012/0208074 A1 Aug. 16, 2012

(30) Foreign Application Priority Data

Feb. 10, 2011 (KR) .................. 10-2011-0011871

(51) Int. Cl.
*H01M 2/08* (2006.01)
(52) U.S. Cl.
USPC ............ 429/185; 429/178; 429/186; 429/174
(58) Field of Classification Search
USPC .................. 429/185, 186, 175, 163, 174, 178
See application file for complete search history.

(56) References Cited

U.S. PATENT DOCUMENTS

| | | |
|---|---|---|
| 2005/0136323 A1 | 6/2005 | Sugimune et al. |
| 2006/0216592 A1* | 9/2006 | Chun ........................ 429/175 |
| 2006/0263685 A1 | 11/2006 | Kwon |
| 2010/0190053 A1 | 7/2010 | Suzuki |
| 2010/0233521 A1* | 9/2010 | Byun et al. ................. 429/72 |
| 2011/0059352 A1 | 3/2011 | Lee |
| 2011/0104559 A1* | 5/2011 | Kim et al. .................. 429/163 |
| 2012/0214030 A1* | 8/2012 | Guen ......................... 429/61 |

FOREIGN PATENT DOCUMENTS

| | | |
|---|---|---|
| EP | 1 705 732 A1 | 9/2006 |
| EP | 2 172 993 A1 | 4/2010 |
| JP | 52-112739 U | 8/1977 |
| JP | 54-038821 U | 3/1979 |
| JP | 2002-231206 | 8/2002 |
| JP | 2003-187760 | 7/2003 |
| JP | 2006-351234 | 12/2006 |
| JP | 2009-026707 | 2/2009 |
| KR | 10-2006-0010655 A | 2/2006 |

(Continued)

OTHER PUBLICATIONS

Korean Office Action corresponding to 10-2011-0011871, dated Sep. 26, 2012, 4 pages.

(Continued)

*Primary Examiner* — Raymond Alejandro
(74) *Attorney, Agent, or Firm* — Christie, Parker & Hale, LLP (57) ABSTRACT

A secondary battery includes an electrode assembly having a first electrode plate, a second electrode plate, and a separator located between the first electrode plate and the second electrode plate; a first collecting plate and a second collecting plate that are electrically connected to the first electrode plate and the second electrode plate, respectively; a case configured to accommodate the electrode assembly, the first collecting plate, and the second collecting plate; and a cap plate configured to close the case to seal the electrode assembly, the first collecting plate and the second collecting plate within the case, wherein reinforcement stepped parts are formed on the cap plate such that a center region of the cap plate has a thickness different from a thickness of peripheral regions of the cap plate.

17 Claims, 9 Drawing Sheets

(56) References Cited

FOREIGN PATENT DOCUMENTS

| KR | 10-2006-0102751 A | 9/2006 |
|---|---|---|
| KR | 10-2006-0113815 A | 11/2006 |
| KR | 10-2011-0027606 A | 3/2011 |

OTHER PUBLICATIONS

EPO Search Report dated May 7, 2013, for corresponding European Patent application 11180119.7, (7 pages).

JPO Office action dated Apr. 23, 2013, for corresponding Japanese Patent application 2011-207074, (3 pages).

Espacenet English Abstract for Japanese Patent 4210961 B1, dated Jan. 21, 2009, for corresponding Japanese publication 2009-026707 dated Feb. 5, 2009, listed above, (2 pages).

Patent Abstracts of Japan, and English machine translation for Japanese Publication 2002-231206 dated Aug. 16, 2002, listed above, (10 pages).

Patent Abstracts of Japan, and English machine translation for Japanese Publication 2003-187760 dated Jul. 4, 2003, listed above, (8 pages).

Patent Abstracts of Japan, and English machine translation for Japanese Publication 2006-351234 dated Dec. 28, 2006, listed above, (10 pages).

Korean Notice of Allowance dated Feb. 19, 2013, for Application No. 10-2011-0011871, 5 pages.

JPO Office action dated Aug. 6, 2013, for corresponding Japanese Patent application 2011-207074, (3 pages).

English translation of JP 54-038821U filed May 31, 2013, 5 pages.

Chinese Office action dated Dec. 27, 2013 issued in corresponding Chinese Application No. 201110288680.8, 8 pages.

English translation of Chinese Office action dated Dec. 27, 2013, 10 pages.

\* cited by examiner

SECONDARY BATTERY WITH STEPPED CAP PLATE

CROSS-REFERENCE TO RELATED APPLICATION

This application claims priority to and the benefit of Korean Patent Application No. 10-2011-0011871 filed on Feb. 10, 2011, in the Korean Intellectual Property Office, the disclosure of which is incorporated in its entirety herein by reference.

BACKGROUND

1. Field

Embodiments of the present invention relate to a secondary battery.

2. Description of the Related Art

Secondary batteries are rechargeable, unlike primary batteries which are not. Types of secondary batteries include a low capacity battery including a battery cell in the form of a pack and typically used for small portable electronic devices such as cellular phones and camcorders, and a high capacity battery including dozens of battery cells connected to one another and typically used as a motor-driving power source for electric scooters, hybrid vehicles, or electric vehicles.

Secondary batteries are manufactured in various shapes such as a cylindrical shape and a prismatic shape. A secondary battery is constructed as follows: an electrode assembly formed by inserting an insulating separator between positive and negative electrode plates is placed in a case together with electrolyte; and a cap plate is located on the case. The electrode assembly is connected to positive and negative terminals which protrude from the cap plate and are exposed to the exterior of the secondary battery.

If a secondary battery is deformed, for example, due to an impact, a short circuit may be caused in the secondary battery to cause a pressure surge, firing, or explosion. Thus, it is desirable to make secondary batteries more durable.

SUMMARY

An aspect of the present invention provides a secondary battery having a stronger cap plate.

Another aspect of the present invention provides a secondary battery that can be used more stably under conditions where external forces are applied to the secondary battery.

According to at least one of embodiments, a secondary battery including: an electrode assembly including a first electrode plate, a second electrode plate, and a separator disposed between the first and second electrode plates; a first collecting plate and a second collecting plate that are electrically connected to the first electrode plate and the second electrode plate; a case configured to accommodate the electrode assembly, the first collecting plate, and the second collecting plate; and a cap plate configured to close the case to seal the electrode assembly, the case, and the first and second collecting plates, wherein reinforcement stepped parts are formed on the cap plate such that a center region of the cap plate has a thickness different from a thickness of both lateral or peripheral regions of the cap plate.

The reinforcement stepped parts may be formed on a bottom surface of the cap plate. The reinforcement stepped parts may be formed between the center region and the lateral regions. The reinforcement stepped parts may be formed such that the center region is thinner than that of the lateral regions.

The reinforcement stepped parts may be formed at positions spaced about 50 mm from both lateral ends of the cap plate toward the center region of the cap plate. A length of each of the lateral regions of the cap plate may be about 20% to about 30% of a length of the cap plate.

The reinforcement stepped parts may be formed to define a predetermined thickness difference between a bottom surface of the center region and bottom surfaces of the lateral regions. The reinforcement stepped parts may be formed such that stepped part lateral surfaces of the reinforcement stepped parts are perpendicular to the bottom surface of the cap plate. Alternatively, the reinforcement stepped parts may be formed such that the stepped part lateral surfaces of the reinforcement stepped parts are inclined from the bottom surface of the cap plate.

The reinforcement stepped parts may be formed such that upper regions of the stepped part lateral surfaces of the reinforcement stepped parts are rounded. The reinforcement stepped parts may be formed such that lower regions of the stepped part lateral surfaces of the reinforcement stepped parts are rounded.

The reinforcement stepped parts may be formed such that the stepped part lateral surfaces of the reinforcement stepped parts have a stair shape. The reinforcement stepped parts may have an arc shape, wherein when viewed from a bottom side of the cap plate, centers of arcs of the reinforcement stepped parts may be located in the bottom surface of the center region. Alternatively, the reinforcement stepped parts may have an arc shape, and when viewed from the bottom side of the cap plate, centers of arcs of the reinforcement stepped parts may be located in the bottom surfaces of the lateral regions.

The secondary battery may further include a first electrode terminal and a second electrode terminal that are inserted through the cap plate and are electrically connected to the first collecting plate and the second collecting plate, wherein the first electrode terminal and the second electrode terminal may be inserted through and coupled to the lateral regions of the cap plate. Bottom surfaces of the center region and the lateral regions may be planar.

The reinforcement stepped parts may be formed on a top surface of the cap plate or both top and bottom surfaces of the cap plate.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, embodiments will be described in detail with reference to the accompanying drawings.

Figure 1:
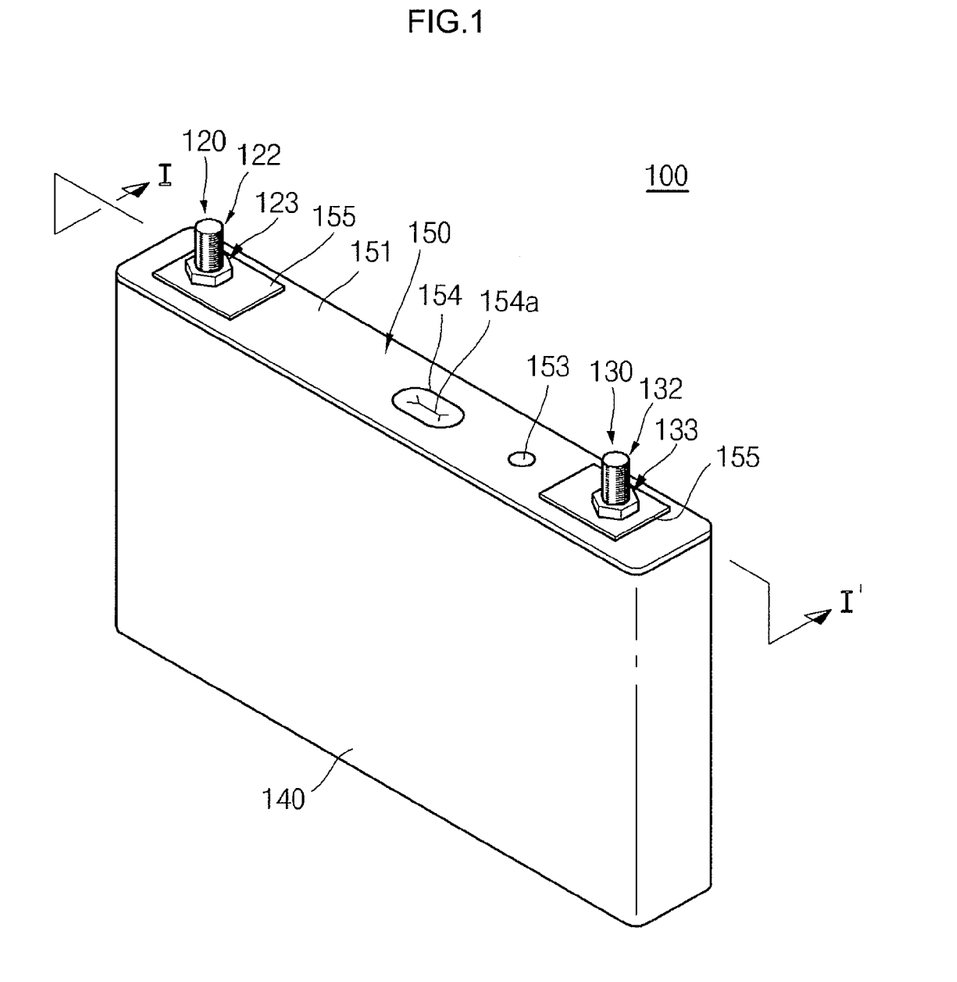
FIG. 1 is a perspective view illustrating a secondary battery according to an embodiment.
Figure 2:
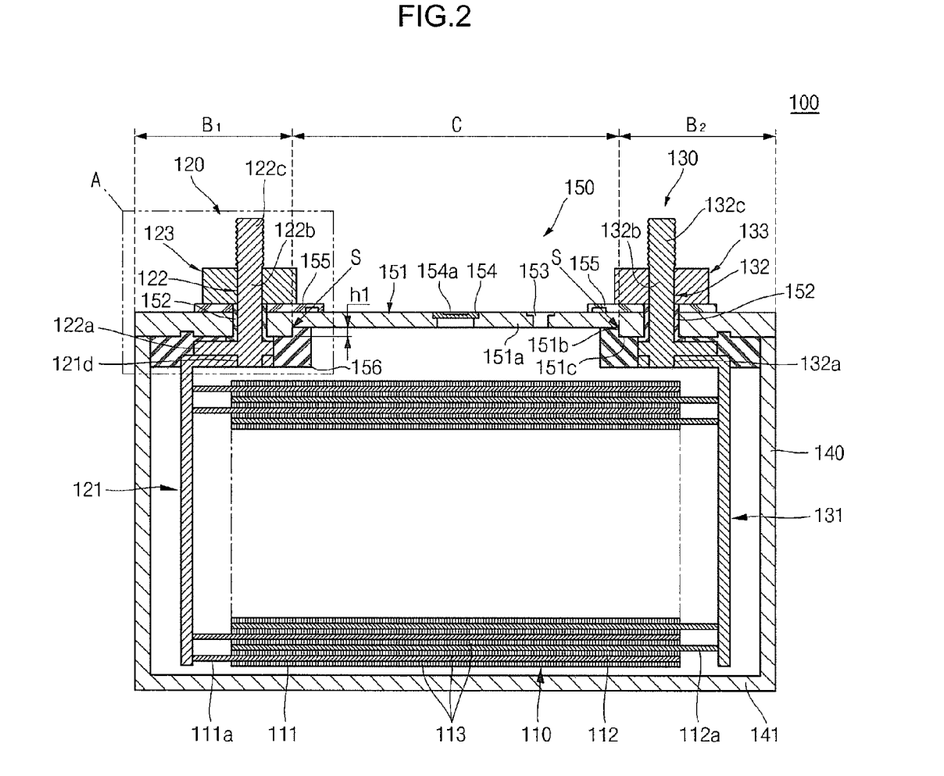
FIG. 2 is a sectional view of the secondary battery taken along line I-I' of FIG. 1.
Figure 3:
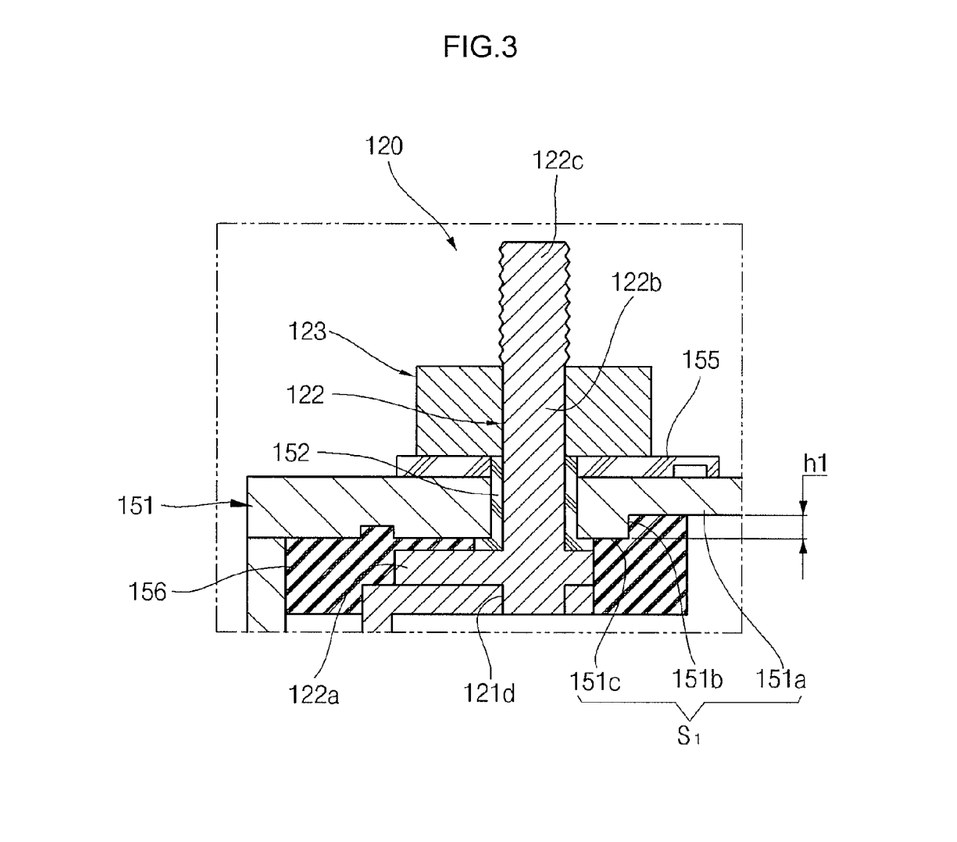
FIG. 3 is an enlarged sectional view illustrating portion A of FIG. 2.

FIG. 1 is a perspective view illustrating a secondary battery 100 according to an embodiment. FIG. 2 is a sectional view of the secondary battery 100 taken along line I-I' of FIG. 1. FIG. 3 is an enlarged sectional view illustrating portion A of FIG. 2.

Referring to FIGS. 1 through 3, the secondary battery 100 of the current embodiment includes an electrode assembly 110, a first terminal 120, a second terminal 130, a case 140, and a cap assembly 150.

The electrode assembly 110 is formed by winding or stacking a first electrode plate 111, a separator 113, and a second electrode plate 112, which have a thin plate or film shape. The electrode assembly 110 has a jelly-roll type wound shape. The first electrode plate 111 may function as a negative electrode, and the second electrode plate 112 may function as a positive electrode. Alternatively, the first electrode plate 111 and the second electrode plate 112 may function oppositely, wherein the polarities of the first and second electrode plates 111 and 112 may be reversed.

The first electrode plate 111 is formed by applying a first electrode active material such as graphite or carbon to a first electrode collecting plate formed of metal foil such as copper or nickel foil. The first electrode plate 111 includes a first electrode non-coating portion 111a to which the first electrode active metal is not applied. In the current embodiment, materials that can be used to form the first electrode plate 111 are not limited to the above-mentioned materials. The first electrode non-coating portion 111a functions as a current flow passage between the first electrode plate 111 and the outside of the first electrode plate 111.

The second electrode plate 112 is formed by applying a second electrode active material such as a transition metal oxide to a second electrode collecting plate formed of metal foil such as aluminum foil. The second electrode plate 112 includes a second electrode non-coating portion 112a to which the second electrode active metal is not applied. In the current embodiment, materials that can be used to form the second electrode plate 112 are not limited to the above-mentioned materials. The second electrode non-coating portion 112a functions as a current flow passage between the second electrode plate 112 and the outside of the second electrode plate 112.

The separator 113 may be located between the first electrode plate 111 and the second electrode plate 112 to prevent a short circuit and allow movement of lithium ions. The separator 113 may be formed of a polyethylene film, a polypropylene film, or a film including polyethylene and polypropylene. In the current embodiment, materials that can be used to form the separator 113 are not limited to the above-mentioned materials.

Substantially, the electrode assembly 110 is accommodated in the case 140 together with electrolyte. The electrolyte may include an organic solvent such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be liquid, solid, or gel.

The first and second terminals 120 and 130 are coupled to both end parts of the electrode assembly 110 in a manner such that the first and second terminals 120 and 130 are electrically connected to the first and second electrode plates 111 and 112, respectively. That is, the first and second terminals 120 and 130 are coupled to both end parts of the electrode assembly 110 in a manner such that the first and second terminals 120 and 130 are connected to the first electrode non-coating portion 111a of the first electrode plate 111 and the second electrode non-coating portion 112a of the second electrode plate 112.

The first terminal 120 is usually formed of a metal or an equivalent thereof, and is electrically connected to the first electrode plate 111. The first terminal 120 includes a first collecting plate 121, a first electrode terminal 122, and a first terminal plate 123.

The first collecting plate 121 makes contact with the first electrode non-coating portion 111a protruding from one side of the electrode assembly 110. Substantially, the first collecting plate 121 is welded to the first electrode non-coating portion 111a. The first collecting plate 121 has an approximately reverse L-shape, and a terminal hole 121d is formed in the upper portion of the first collecting plate 121. The first electrode terminal 122 is fitted and coupled to the terminal hole 121d. For example, the first collecting plate 121 is formed of copper or a copper alloy. However, the material of the first collecting plate 121 is not limited thereto.

The first electrode terminal 122 penetrates a cap plate 151 (described later) and protrudes upward, i.e., away from an interior portion of the case 140. The first electrode terminal 122 is electrically connected to the first collecting plate 121 at the lower side of the cap plate 151. The first electrode terminal 122 protrudes upward from the cap plate 151, and includes a flange 122a at a position under the cap plate 151 so that the first electrode terminal 122 is not easily separated from the cap plate 151.

A part of the first electrode terminal 122 below than the flange 122a is inserted in and welded to the terminal hole 121d of the first collecting plate 121 and a part of the first electrode terminal 122 above than the flange 122a is fixed to the first terminal plate 123. That is, the part of the first electrode terminal 122 above than the flange 122a includes a first body 122b penetrating the cap plate 151, and a first coupling part 122c extending from the top surface of the first body part 122b and screw-coupled to the first terminal plate 123. A thread is formed on the outer surface of the first coupling part 122c. Alternatively, the first coupling part 122c may be coupled to the first terminal plate 123 by a rivet. The first electrode terminal 122 is electrically insulated from the cap plate 151. For example, the first electrode terminal 122 may be formed of one of copper, copper alloy, and an equivalent thereof. However, the material of the first electrode terminal 122 is not limited thereto.

The first terminal plate 123 may be a nut having an approximately hexagonal pillar shape and configured to be coupled with the first coupling part 122c. Alternatively, the first terminal plate 123 may have another shape. For example, a penetration hole may be formed through a center part of the first terminal plate 123 in an approximately vertical direction so that the first electrode terminal 122 can be inserted through the first terminal plate 123, and a receiving groove may be formed in an upper part of the first terminal plate 123 so that the first coupling part 122c can be accommodated therein. The first terminal plate 123 may be formed of one of stainless steel, copper, copper alloy, aluminum, aluminum alloy, and an equivalent thereof. However, the current embodiment is not limited to such materials. The first terminal plate 123 and the cap plate 151 are insulated from each other.

The second terminal 130 is usually formed of a metal or an equivalent thereof, and is electrically connected to the second electrode plate 112. The second terminal 130 includes a second collecting plate 131, a second electrode terminal 132, and a second terminal plate 133. The second terminal 130 may have substantially the same shape as the first terminal 120. Thus, descriptions thereof will not be repeated. The second collecting plate 131 and the second electrode terminal 132 may usually be formed of one of aluminum, an aluminum alloy, and an equivalent thereof. However, the current embodiment is not limited to such materials. The second terminal plate 133 may be formed of one of stainless steel, aluminum, aluminum alloy, copper, copper alloy, and an equivalent thereof. However, the current embodiment is not limited thereto.

In addition, the second terminal plate 133 may be electrically connected to the cap plate 151. In this case, the case 140 and the cap plate 151 (that will be described below in detail) may have the same polarity (for example, a positive polarity) as the second terminal 130.

The case 140 accommodates the electrode assembly 110, the first electrode terminal 122, and the second electrode terminal 132. The electrode assembly 110 is accommodated in the case 110 together with electrolyte. The case 140 has an approximately hexahedron shape with an opening so that the electrode assembly 110, the first terminal 120, and the second terminal 130 can be inserted and placed in the case 140. In FIG. 2, a state where the case 140 and the cap assembly 150 are coupled to each other, wherein the peripheral part of the cap assembly 150 substantially corresponds to the opening of the case 140. The case 140 may be formed of one of aluminum, copper, iron, stainless steel such as SUS, ceramic material, polymer, and an equivalent thereof. However, the current embodiment is not limited to such materials. The case 140 may be electrically connected to one of the first and second electrode plates 111 and 112 of the electrode assembly 110. That is, the case 140 may have one of positive and negative polarities.

The cap assembly 150 is coupled to the case 140. In detail, the cap assembly 150 includes the cap plate 151, sealing gaskets 152, a plug 153, a safety vent 154, upper insulation members 155, and lower insulation members 156. Alternatively, the sealing gaskets 152, the upper insulation members 155, and the lower insulation members 156 may be considered as elements of the first and second terminals 120 and 130.

The cap plate 151 closes the opening of the case 140. The cap plate 151 may formed of the same material as the case 140. For example, the cap plate 151 may be coupled to the case 140 by laser welding. As described above, the cap plate 151 may have the same polarity as that of the second terminal 130. In this case, the cap plate 151 and the case 140 may have the same polarity.

The cap plate 151 includes a center region (C) and lateral regions $B_1$ and $B_2$. Reinforcement stepped parts (S) are formed on the bottom surface of the cap plate 151 between the center region (C) and the lateral regions $B_1$ and $B_2$. In the current embodiment, the reinforcement stepped parts (S) are formed on the bottom surface of the cap plate 151. However, the current embodiment is not limited thereto. For example, the reinforcement stepped parts (S) may be formed on the top surface of the cap plate 151, or both the top surface and bottom surface of the cap plate 151. This configuration may also be applied to the next embodiments. Due to the reinforcement stepped parts (S), the thickness of the center region (C) is different from that of the lateral regions $B_1$ and $B_2$. That is, the center region (C) is thinner than the lateral regions $B_1$ and $B_2$. Since portions of the bottom surface of the cap plate 151 which can be easily crushed or deformed are reinforced by the reinforcement stepped parts (S), the cap plate 151 can be more structural stable. For example, the top surface of the cap plate 151 may also be prevented from being crushed or distorted. The bottom surfaces of the center region (C) and the lateral regions $B_1$ and $B_2$ of the cap plate 151 are substantially planar. In the following descriptions of embodiments, center and lateral regions of a cap plate will be denoted by the same reference numerals (C), $B_1$, and $B_2$.

Referring to FIG. 3, there is a thickness difference between a bottom surface 151a of the center region (C) and a bottom surface 151c of the lateral regions $B_1$ and $B_2$ (only one lateral region is shown). In the reinforcement stepped parts $S_1$ (only one reinforcement stepped part is shown), stepped part lateral surfaces 151b (only one is shown) may be perpendicular to the bottom surface 151a of the center region (C) and the bottom surfaces 151c of the lateral regions $B_1$ and $B_2$. Various reinforcement stepped parts will be described later in detail with reference to FIGS. 4 through 9 according to other embodiments. In one embodiment, the reinforcement stepped parts $S_1$ are formed at positions spaced about 50 mm from lateral ends of the cap plate 151 toward the center region (C). For example, if the total length of the cap plate 151 is about 170 mm, the reinforcement stepped parts $S_1$ may be formed at positions spaced about 50 mm from the lateral ends of the cap plate 151. In this case, the center region (C) of the cap plate 151 may be about 70 mm in length. The length of each of the lateral regions $B_1$ and $B_2$ is about 20% to about 30% of the length of the cap plate 151. The thickness of the center region (C) of the cap plate 151 may be about 0.85 mm, and the thickness of the lateral regions $B_1$ and $B_2$ of the cap plate 151 may be about 3.0 mm.

The first and second electrode terminals 122 and 132 are inserted in and coupled to the lateral regions $B_1$ and $B_2$ of the cap plate 151.

In the current embodiment, because of the reinforcement stepped parts (S) formed on the bottom surface of the cap plate 151, the thickness of the cap plate 151 is varied from the center region (C) to the lateral regions $B_1$ and $B_2$ to reinforce an easily-deformable part, and thus the strength of the cap plate 151 can be effectively improved.

The sealing gaskets 152 are formed of an insulating material and are located between the cap plate 151 and the first and second electrode terminals 122 and 132 to seal the gaps between the cap plate 151 and the first and second electrode terminals 122 and 132. The sealing gaskets 152 prevent permeation of moisture into the secondary battery 100 or leakage of electrolyte from the inside of the secondary battery 100.

The plug 153 closes an electrolyte injection hole of the cap plate 151. The safety vent 154 is located on a vent hole of the cap plate 151, and a notch 154a is formed in the safety vent 154 so that the safety vent 154 can be opened at a preset pressure.

The upper insulation members 155 are located between the cap plate 151 and the first and second terminal plates 123 and 133. In addition, the upper insulation members 155 make tight contact with the cap plate 151 and with the sealing gaskets 152. The upper insulation members 155 insulate the cap plate 151 from the first and second terminal plates 123 and 133.

The lower insulation members 156 are located between the cap plate 151 and the first and second collecting plates 121 and 131 to prevent an unnecessary short circuit. That is, the lower insulation members 156 prevent a short circuit between the first collecting plate 121 and the cap plate 151 and a short circuit between the second collecting plate 131 and the cap plate 151. The lower insulation members 156 are also located between the cap plate 151 and the first and second electrode terminals 122 and 132 so that a short circuit can be prevented between the cap plate 151 and the first and second electrode terminals 122 and 132.

Therefore, according to the current embodiment, the secondary battery 100 can be less deformed by an external force, and thus the secondary battery 100 can be more structurally stable.

Figure 4:
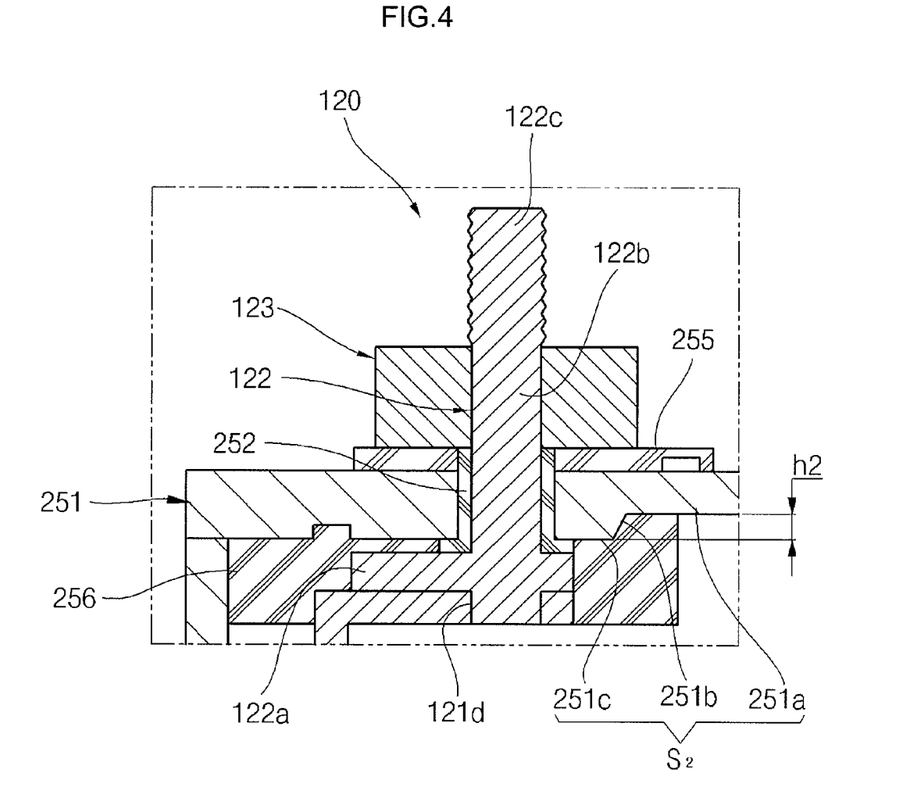
FIG. 4 is an enlarged sectional view illustrating a portion of a secondary battery according to another embodiment, the portion generally corresponding to portion A of FIG. 2.

FIG. 4 is an enlarged sectional view illustrating a portion of a secondary battery according to another embodiment, the portion corresponding to portion A of FIG. 3.

Referring to FIG. 4, there a thickness difference between a bottom surface 251a of a center region (C) of a cap plate 251 and bottom surfaces 251c of lateral regions $B_1$ and $B_2$ (only one lateral region is shown) of the cap plate 251 to form reinforcement stepped parts $S_2$ (only one reinforcement stepped part $S_2$ is shown). The bottom surface 251a of the center region (C), and the bottom surfaces 251c of the lateral regions $B_1$ and $B_2$ are substantially planar, and stepped part lateral surfaces 251b (only one is shown) connecting the bottom surface 251a and the bottom surfaces 251c are inclined. The stepped part lateral surfaces 251b may be inclined toward the center region (C) or toward both sides of the center region (C). The thickness difference h2 between the center region (C) and the lateral regions $B_1$ and $B_2$ may be equal to the thickness h1 shown in FIGS. 2 and 3.

Figure 5:
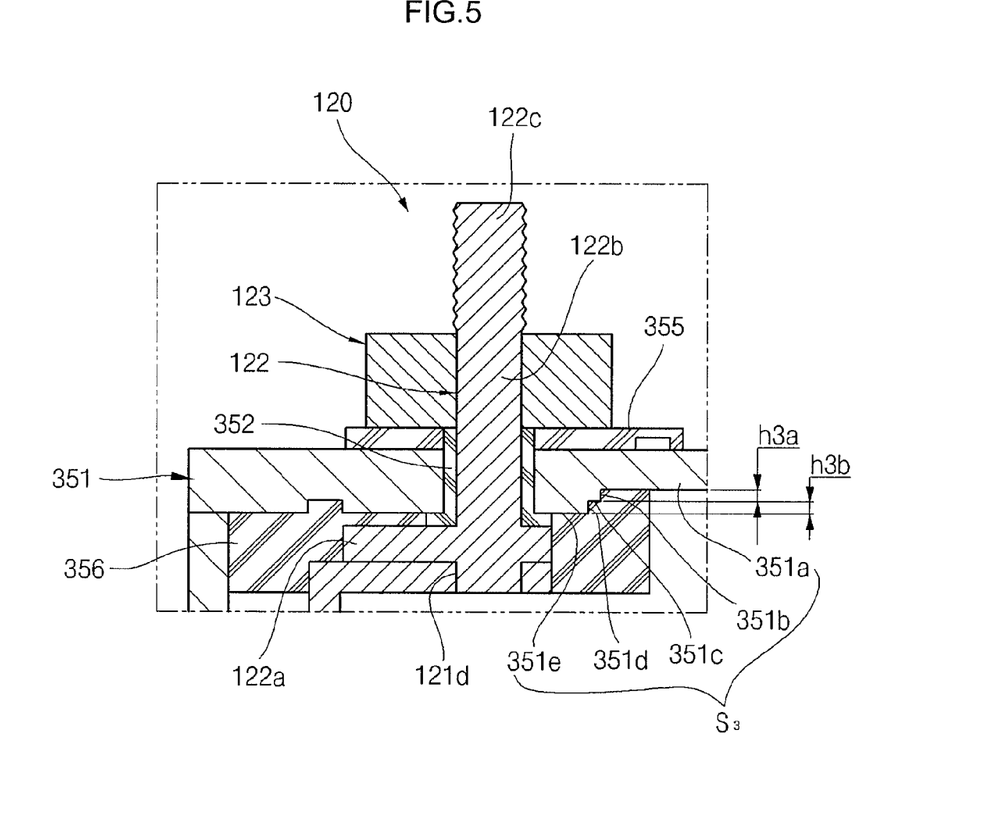
FIG. 5 is an enlarged sectional view illustrating a portion of a secondary battery according to another embodiment, the portion generally corresponding to portion A of FIG. 2.

FIG. 5 is an enlarged sectional view illustrating a portion of a secondary battery according to another embodiment, the portion corresponding to portion A of FIG. 3.

Referring to FIG. 5, reinforcement stepped parts S3 (only one is shown) is formed in a stair shape between a bottom surface 351a of a center region (C) of a cap plate 351 and bottom surfaces 351e of lateral regions $B_1$ and $B_2$ (only one is shown) of the cap plate 351. In other words, the reinforcement stepped parts $S_3$, which are formed between the bottom surface 351a of the center region (C) and the bottom surfaces 351e of the lateral regions $B_1$ and $B_2$, has a stair shape formed by two stepped part lateral surfaces 351b and 351d and a stepped part horizontal surface 351c between the stepped part lateral surfaces 351b and 351d. The current embodiment is not limited to two stairs, and three or more stairs may be formed. The sum of two thickness differences h3a and h3b between the center region (C) and the lateral regions $B_1$ and $B_2$ may be equal to the thickness h1 shown in FIGS. 2 and 3.

Figure 6:
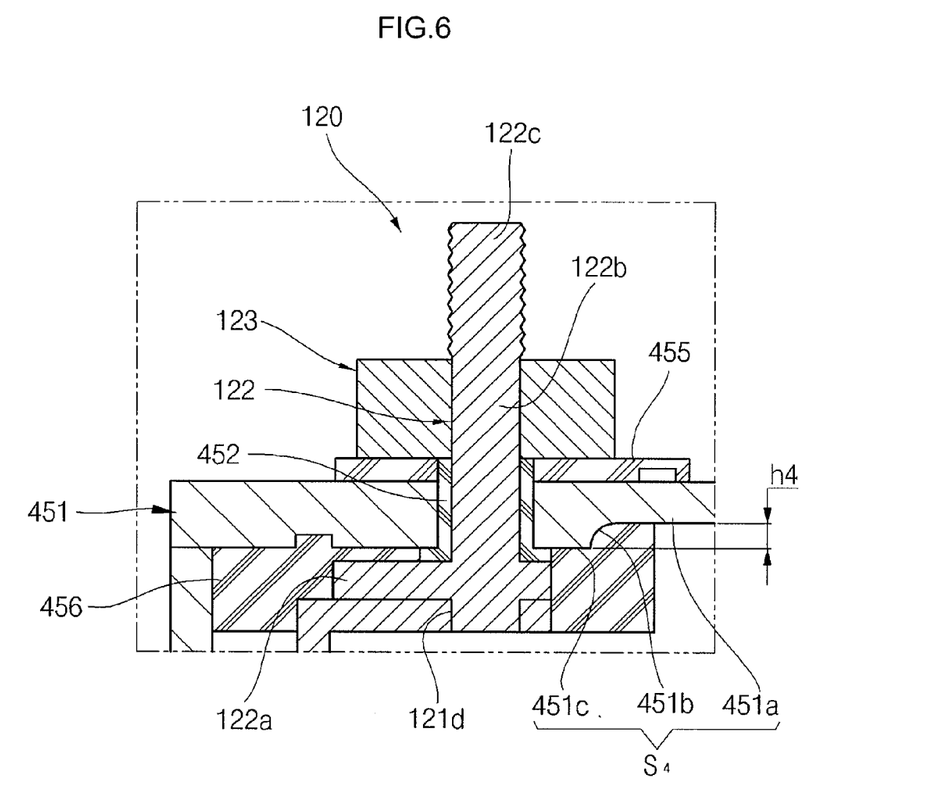
FIG. 6 is an enlarged sectional view illustrating a portion of a secondary battery according to another embodiment, the portion generally corresponding to portion A of FIG. 2.

FIG. 6 is an enlarged sectional view illustrating a portion of a secondary battery according to another embodiment, the portion corresponding to portion A of FIG. 3.

Referring to FIG. 6, reinforcement stepped parts $S_4$ (only one is shown) include rounded portions extending from both sides of a bottom surface 451a of a center region (C) of a cap plate 451. In detail, the reinforcement stepped parts $S_4$ may include stepped part lateral surfaces 451b (only one is shown) between the bottom surface 451a of the center region (C) and bottom surfaces 451c of lateral regions $B_1$ and $B_2$, and upper portions of the stepped part lateral surfaces 451b may be rounded in a parabolic or arc shape. The thickness h4 of the stepped part lateral surfaces 451b which is a thickness difference between the center region (C) and the lateral regions $B_1$ and $B_2$ may be equal to the thickness h1 shown in FIGS. 2 and 3.

Figure 7:
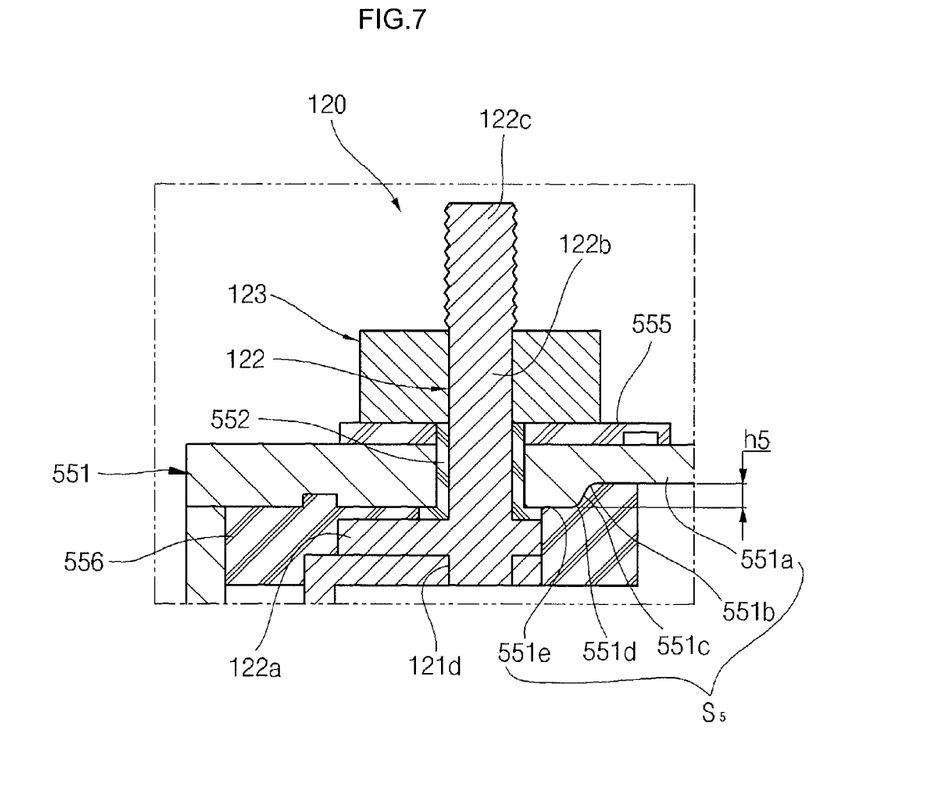
FIG. 7 is an enlarged sectional view illustrating a portion of a secondary battery according to another embodiment, the portion generally corresponding to portion A of FIG. 2.

FIG. 7 is an enlarged sectional view illustrating a portion of a secondary battery according to another embodiment, the portion corresponding to portion A of FIG. 3.

Referring to FIG. 7, reinforcement stepped parts $S_5$ (only one is shown) include: rounded portions extending from both sides of a bottom surface 551a of a center region (C) of a cap plate 551 like in FIG. 6; and rounded portions extending from bottom surfaces 551e of lateral regions $B_1$ and $B_2$ of the cap plate 551. In detail, the reinforcement stepped parts $S_5$ may include stepped part lateral surfaces 551c (only one is shown) between the bottom surface 551a of the center region (C) and the bottom surfaces 551e of the lateral regions $B_1$ and $B_2$, and upper portions 551b and lower portions 551d of the stepped part lateral surfaces 551c may be rounded in parabolic or arc shapes. The thickness h5 of the stepped part lateral surfaces 551c which is a thickness difference between the center region (C) and the lateral regions $B_1$ and $B_2$ may be equal to the thickness h1 shown in FIGS. 2 and 3.

Figure 8:
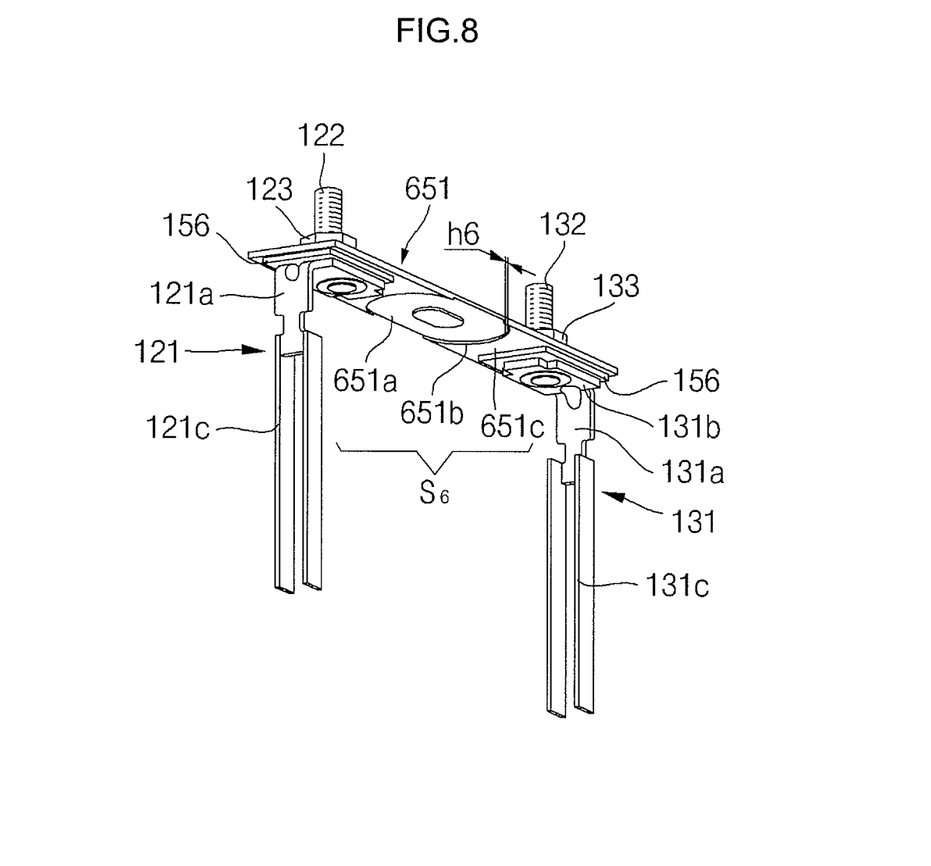
FIG. 8 is a bottom perspective view illustrating a cap plate of a secondary battery according to another embodiment.

FIG. 8 is a bottom perspective view illustrating a cap plate of a secondary battery according to another embodiment.

Referring to FIG. 8, reinforcement stepped parts $S_6$ are formed in an arc shape. When viewed from the bottom side of a cap plate 651, the centers of the arcs of the reinforcement stepped parts $S_6$ are located in a bottom surface 651a of a center region (C) of the cap plate 651. In detail, the reinforcement stepped parts $S_6$ may include stepped part lateral surfaces 651b between the bottom surface 651a of the center region (C) and bottom surfaces 651c of lateral regions $B_1$ and $B_2$ of the cap plate 651, and the stepped part lateral surfaces 651b may be arc shaped. The thickness h6 of the stepped part lateral surfaces 651b which is a thickness difference between the center region (C) and the lateral regions $B_1$ and $B_2$ may be equal to the thickness h1 shown in FIGS. 2 and 3.

Figure 9:
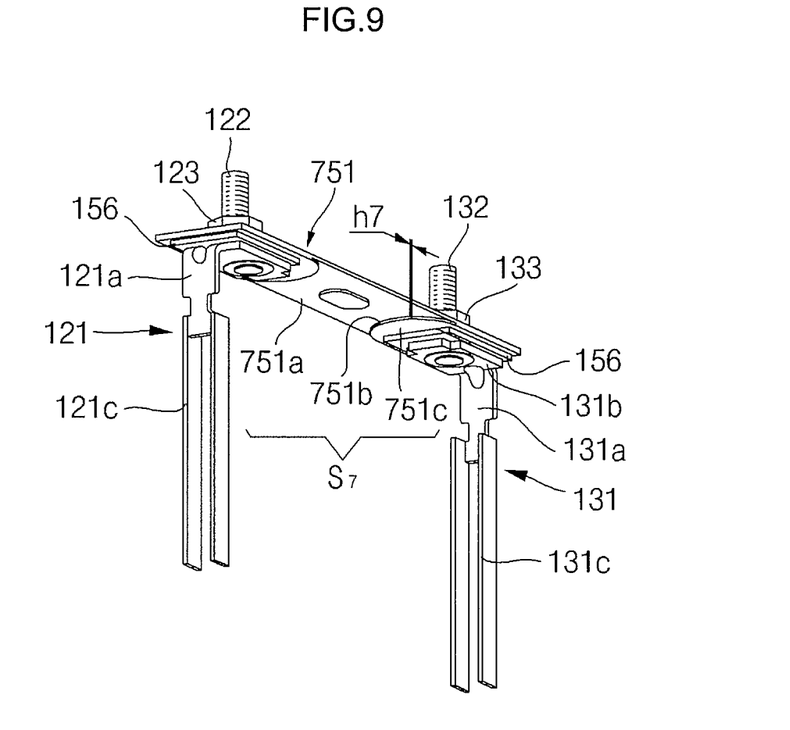
FIG. 9 is a bottom perspective view illustrating a cap plate of a secondary battery according to still another embodiment.

FIG. 9 is a bottom perspective view illustrating a cap plate of a secondary battery according to another embodiment.

Referring to FIG. 9, reinforcement stepped parts $S_7$ are formed in an arc shape. When viewed from the bottom side of a cap plate 751, the centers of the arcs of the reinforcement stepped parts $S_7$ are located in bottom surfaces 751c of lateral regions $B_1$ and $B_2$ of the cap plate 751. In detail, the reinforcement stepped parts $S_7$ may include stepped part lateral surfaces 751b between a bottom surface 751a of a center region (C) of the cap plate 751 and the bottom surfaces 751c of the lateral regions $B_1$ and $B_2$ of the cap plate 751, and the stepped part lateral surfaces 751b may be arc shaped. The thickness h7 of the stepped part lateral surfaces 751b which is a thickness difference between the center region (C) and the lateral regions $B_1$ and $B_2$ may be equal to the thickness h1 shown in FIGS. 2 and 3.

As described above, according to the embodiments, various reinforcement stepped parts are provided so that the center region of the cap plate can be thinner than the lateral regions of the cap plate that receive external forces more frequently. Therefore, the weight of the secondary battery can be reduced while improving the strength of the secondary battery.

According to the embodiments, the cap plate of the secondary battery is strengthened in a manner such that regions of the cap plate close to the case have a thickness different from the thickness of other regions because the regions receive external forces more frequently.

In addition, according to the embodiments, since the secondary battery is less deformed by an external force, the secondary battery can be used more stably.

In addition, according to the embodiments, the strength of the cap plate can be improved, and the weight of the secondary battery can be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery comprising:
    an electrode assembly comprising a first electrode plate, a second electrode plate, and a separator located between the first electrode plate and the second electrode plate;
    a first collecting plate and a second collecting plate that are electrically connected to the first electrode plate and the second electrode plate, respectively;
    a case configured to accommodate the electrode assembly, the first collecting plate, and the second collecting plate;
    a plurality of electrode terminals;
    a cap plate sealing the case such that the electrode terminals protrude through the cap plate, and the cap plate being a single integral plate having a first surface facing away from the electrode assembly and a second surface opposite the first surface and facing towards the electrode assembly, wherein the cap plate has lateral regions encompassing each of the electrode terminals and extending to an edge of the cap plate and a center region between the lateral regions, the cap plate having reinforcement stepped parts on the lateral regions such that a thickness between the first surface and the second surface of an entirety of the lateral regions is greater than a thickness between the first surface and the second surface of an entirety of the center region; and
    a sealing gasket directly contacting the case, the cap plate, and one of the electrode terminals.

2. The secondary battery as claimed in claim 1, wherein the reinforcement stepped parts are on an interior-facing surface of the cap plate.

3. The secondary battery as claimed in claim 2, wherein the reinforcement stepped parts are formed between the center region and the peripheral regions.

4. The secondary battery as claimed in claim 2, wherein the reinforcement stepped parts are formed such that the center region is thinner than the peripheral regions.

5. The secondary battery as claimed in claim 4, wherein the reinforcement stepped parts are spaced by about 50 mm from respective peripheral ends of the cap plate.

6. The secondary battery as claimed in claim 4, wherein a length of each of the peripheral regions of the cap plate is about 20% to about 30% of a length of the cap plate.

7. The secondary battery as claimed in claim 4, wherein the reinforcement stepped parts define a thickness difference between an interior-facing surface of the center region and an interior-facing surface of the peripheral regions.

8. The secondary battery as claimed in claim 7, wherein the reinforcement stepped parts have stepped part peripheral surfaces that are substantially perpendicular to the interior-facing surface of the cap plate.

9. The secondary battery as claimed in claim 7, wherein the reinforcement stepped parts have stepped part peripheral surfaces that are inclined from the bottom surface of the cap plate.

10. The secondary battery as claimed in claim 7, wherein the reinforcement stepped parts are formed such that upper regions of stepped part peripheral surfaces of the reinforcement stepped parts are rounded.

11. The secondary battery as claimed in claim 10, wherein the reinforcement stepped parts are formed such that lower regions of the stepped part peripheral surfaces of the reinforcement stepped parts are rounded.

12. The secondary battery as claimed in claim 7, wherein the reinforcement stepped parts have stepped part peripheral surfaces comprise a plurality of steps.

13. The secondary battery as claimed in claim 7, wherein the reinforcement stepped parts have an arc shape such that when viewed from a bottom side of the cap plate, a center of an arc of the reinforcement stepped part is located in the bottom surface of the center region.

14. The secondary battery as claimed in claim 7, wherein the reinforcement stepped parts have an arc shape and when viewed from a bottom side of the cap plate, a center of an arc of the reinforcement stepped part is located in the bottom surface of the peripheral regions.

15. The secondary battery as claimed in claim 2, further comprising a first electrode terminal and a second electrode terminal that protrude through the cap plate and are electrically connected to the first collecting plate and the second collecting plate,
    wherein the first electrode terminal and the second electrode terminal are inserted through and coupled to respective peripheral regions of the cap plate.

16. The secondary battery as claimed in claim 2, wherein bottom surfaces of the center region and the peripheral regions are substantially planar.

17. The secondary battery as claimed in claim 1, wherein the reinforcement stepped parts are formed on an exterior-facing surface of the cap plate or both exterior-facing and interior-facing surfaces of the cap plate.

* * * * *